(12) United States Patent
Brennan et al.

(10) Patent No.: US 8,613,301 B2
(45) Date of Patent: Dec. 24, 2013

(54) COMPACTION OF PREPREG PLIES ON COMPOSITE LAMINATE STRUCTURES

(71) Applicant: The Boeing Company, Chicago, IL (US)

(72) Inventors: Joseph D. Brennan, Santa Clarita, CA (US); Travis J. Sherwood, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/657,137

(22) Filed: Oct. 22, 2012

(65) Prior Publication Data

US 2013/0042978 A1 Feb. 21, 2013

Related U.S. Application Data

(62) Division of application No. 12/242,477, filed on Sep. 30, 2008, now Pat. No. 8,333,864.

(51) Int. Cl.
*B32B 37/10* (2006.01)

(52) U.S. Cl.
USPC ............ 156/382; 156/285; 425/388; 425/504

(58) Field of Classification Search
USPC ........... 156/285, 286, 382; 264/511; 425/388, 425/504
See application file for complete search history.

(56) References Cited

U.S. PATENT DOCUMENTS

| | | |
|---|---|---|
| 2,374,894 A | 5/1945 | Pioch et al. |
| 2,679,278 A | 5/1954 | Clark |
| 3,101,290 A | 8/1963 | Frederic et al. |
| 3,739,166 A | 6/1973 | Anderson |
| 3,983,282 A | 9/1976 | Seemann, III |
| 4,015,035 A | 3/1977 | Blad et al. |
| 4,016,022 A | 4/1977 | Browning et al. |
| 4,049,484 A * | 9/1977 | Priest et al. .................. 156/285 |
| 4,120,632 A | 10/1978 | Stoeberl |
| 4,132,755 A | 1/1979 | Johnson |
| 4,208,238 A | 6/1980 | August et al. |
| 4,238,539 A | 12/1980 | Yates et al. |
| 4,287,015 A | 9/1981 | Danner, Jr. |
| 4,476,797 A | 10/1984 | Ivanov et al. |
| 4,491,081 A | 1/1985 | Ivanov |

(Continued)

FOREIGN PATENT DOCUMENTS

| | | |
|---|---|---|
| DE | 102004046520 A1 | 4/2005 |
| EP | 0230682 A2 | 8/1987 |

(Continued)

OTHER PUBLICATIONS

Office Action, dated Oct. 24, 2012, regarding USPTO U.S. Appl. No. 11/952,222, 39 pages.

(Continued)

*Primary Examiner* — Katarzyna Wyrozebski Lee
*Assistant Examiner* — Scott W Dodds
(74) *Attorney, Agent, or Firm* — Yee & Associates, P.C.

(57) ABSTRACT

A flexible compaction sheet is used to compact uncured composite plies onto the surface of a ply layup. The compaction sheet includes a peripheral seal that seals the perimeter of the sheet to the surface of the part layup and forms a vacuum chamber over the plies which is evacuated through the sheet to apply compaction pressure to the plies.

13 Claims, 5 Drawing Sheets

(56) References Cited

U.S. PATENT DOCUMENTS

| | | | |
|---|---|---|---|
| 4,491,493 A | 1/1985 | Eaton |
| 4,496,412 A | 1/1985 | Ritter |
| 4,548,859 A | 10/1985 | Kline et al. |
| 4,554,036 A | 11/1985 | Newsom |
| 4,564,543 A | 1/1986 | Ritter |
| 4,588,626 A | 5/1986 | Cologna et al. |
| 4,622,091 A | 11/1986 | Letterman |
| 4,698,115 A | 10/1987 | Dodds |
| 4,741,943 A | 5/1988 | Hunt |
| 4,824,513 A | 4/1989 | Dodds |
| 4,875,962 A | 10/1989 | Breakspear |
| 4,902,215 A | 2/1990 | Seemann, III |
| 4,917,353 A | 4/1990 | Riley |
| 4,934,199 A | 6/1990 | Avila et al. |
| 4,942,013 A | 7/1990 | Palmer et al. |
| 4,945,488 A | 7/1990 | Carver et al. |
| 4,961,799 A | 10/1990 | Cologna et al. |
| 4,987,700 A | 1/1991 | Westerman et al. |
| 5,033,014 A | 7/1991 | Carver et al. |
| 5,034,254 A | 7/1991 | Cologna et al. |
| 5,052,906 A | 10/1991 | Seemann |
| 5,071,338 A | 12/1991 | Dublinski et al. |
| 5,087,193 A | 2/1992 | Herbert, Jr. |
| 5,116,216 A | 5/1992 | Cochran et al. |
| 5,123,985 A | 6/1992 | Evans et al. |
| 5,129,813 A | 7/1992 | Shepherd |
| 5,167,742 A | 12/1992 | Peters |
| 5,180,046 A | 1/1993 | Hutton et al. |
| 5,190,611 A | 3/1993 | Cologna et al. |
| 5,207,541 A | 5/1993 | Westerman et al. |
| 5,217,669 A | 6/1993 | Dublinski et al. |
| 5,290,386 A | 3/1994 | Trudeau |
| 5,316,462 A | 5/1994 | Seemann |
| 5,350,614 A | 9/1994 | Chase et al. |
| 5,359,887 A | 11/1994 | Schwab et al. |
| 5,364,584 A | 11/1994 | Imanara et al. |
| 5,427,518 A | 6/1995 | Morizot et al. |
| 5,427,725 A | 6/1995 | White et al. |
| 5,429,326 A | 7/1995 | Garesche et al. |
| 5,439,635 A | 8/1995 | Seemann |
| 5,441,692 A | 8/1995 | Taricco |
| 5,514,232 A | 5/1996 | Burns |
| 5,576,030 A | 11/1996 | Hooper |
| 5,601,852 A | 2/1997 | Seemann |
| 5,612,492 A | 3/1997 | Schwab et al. |
| 5,667,881 A | 9/1997 | Rasmussen et al. |
| 5,683,646 A | 11/1997 | Reiling, Jr. |
| 5,702,663 A | 12/1997 | Seemann |
| 5,721,034 A | 2/1998 | Seemann, III et al. |
| 5,759,325 A | 6/1998 | Davis |
| 5,780,721 A | 7/1998 | Levens |
| 5,820,894 A | 10/1998 | Kreutzer |
| 5,879,489 A | 3/1999 | Burns et al. |
| 5,882,756 A | 3/1999 | Alston et al. |
| 5,904,972 A | 5/1999 | Tunis, III et al. |
| 5,932,256 A | 8/1999 | Mandish |
| 5,939,013 A | 8/1999 | Han et al. |
| 5,954,898 A | 9/1999 | McKague et al. |
| 5,958,325 A | 9/1999 | Seemann, III et al. |
| 6,090,335 A | 7/2000 | McClure et al. |
| 6,096,164 A | 8/2000 | Benson et al. |
| 6,206,067 B1 | 3/2001 | Kociemba et al. |
| 6,211,497 B1 | 4/2001 | Matsen et al. |
| 6,284,089 B1 | 9/2001 | Anderson et al. |
| 6,298,896 B1 | 10/2001 | Sherrill et al. |
| 6,299,819 B1 | 10/2001 | Han |
| 6,355,203 B1 | 3/2002 | Charmes et al. |
| 6,391,246 B2 | 5/2002 | Shiraishi et al. |
| 6,391,436 B1 | 5/2002 | Xu et al. |
| 6,406,659 B1 | 6/2002 | Lang et al. |
| 6,408,517 B1 | 6/2002 | Lehmker et al. |
| 6,461,551 B1 | 10/2002 | Mandish |
| 6,510,977 B1 * | 1/2003 | Hertz .................. 228/246 |
| 6,533,985 B1 | 3/2003 | Smith |
| 6,551,091 B1 | 4/2003 | Bryant et al. |
| 6,575,218 B1 | 6/2003 | Burns et al. |
| 6,579,418 B2 | 6/2003 | Lindsay et al. |
| 6,589,472 B1 | 7/2003 | Benson et al. |
| 6,638,466 B1 | 10/2003 | Abbott |
| 6,689,438 B2 | 2/2004 | Kennedy et al. |
| 6,692,681 B1 | 2/2004 | Lunde |
| 6,696,690 B2 | 2/2004 | Benne |
| 6,761,783 B2 | 7/2004 | Keller et al. |
| 6,797,390 B2 | 9/2004 | Asai et al. |
| 6,808,143 B2 | 10/2004 | Munk et al. |
| 6,830,079 B1 | 12/2004 | Ahrens et al. |
| 6,860,957 B2 | 3/2005 | Sana et al. |
| 6,919,039 B2 | 7/2005 | Lang et al. |
| 7,029,267 B2 | 4/2006 | Caron |
| 7,127,950 B2 | 10/2006 | Fonov et al. |
| 7,137,182 B2 | 11/2006 | Nelson |
| 7,141,191 B2 | 11/2006 | Engwall et al. |
| 7,186,367 B2 | 3/2007 | Hou et al. |
| 7,228,611 B2 | 6/2007 | Anderson et al. |
| 7,294,220 B2 | 11/2007 | Anderson |
| 7,306,450 B2 | 12/2007 | Hanson |
| 7,398,586 B2 | 7/2008 | Prichard et al. |
| 7,398,698 B2 | 7/2008 | Griess et al. |
| 7,413,694 B2 | 8/2008 | Waldrop, III et al. |
| 7,503,368 B2 | 3/2009 | Chapman et al. |
| 7,521,105 B2 | 4/2009 | Bech et al. |
| 7,527,759 B2 | 5/2009 | Lee et al. |
| 7,534,615 B2 | 5/2009 | Havens |
| 7,622,066 B2 | 11/2009 | Brustad et al. |
| 7,624,488 B2 | 12/2009 | Lum et al. |
| 7,628,879 B2 | 12/2009 | Ackerman |
| 7,655,168 B2 | 2/2010 | Jones et al. |
| 7,762,122 B2 | 7/2010 | Advani et al. |
| 7,849,729 B2 | 12/2010 | Miller et al. |
| 7,871,040 B2 | 1/2011 | Lee et al. |
| 7,963,038 B2 | 6/2011 | Schmitz |
| 7,964,049 B2 | 6/2011 | Kapur et al. |
| 8,003,034 B2 | 8/2011 | Oldani et al. |
| 8,114,673 B2 | 2/2012 | Mills et al. |
| 8,409,396 B2 | 4/2013 | Bech et al. |
| 2002/0060018 A1 | 5/2002 | Lindsay et al. |
| 2003/0082321 A1 | 5/2003 | Kennedy et al. |
| 2003/0175511 A1 | 9/2003 | Asai et al. |
| 2004/0026025 A1 | 2/2004 | Sana et al. |
| 2004/0031567 A1 | 2/2004 | Engelbart et al. |
| 2004/0258562 A1 | 12/2004 | Mills et al. |
| 2005/0086916 A1 | 4/2005 | Caron |
| 2005/0102814 A1 | 5/2005 | Anderson et al. |
| 2005/0112772 A1 | 5/2005 | Farone et al. |
| 2005/0161154 A1 | 7/2005 | Anderson |
| 2005/0230055 A1 | 10/2005 | Sana et al. |
| 2005/0236735 A1 | 10/2005 | Oldani et al. |
| 2005/0253309 A1 | 11/2005 | Hou et al. |
| 2006/0108058 A1 | 5/2006 | Chapman et al. |
| 2006/0118235 A1 | 6/2006 | Lum et al. |
| 2006/0121613 A1 | 6/2006 | Havens |
| 2007/0029527 A1 | 2/2007 | Mills et al. |
| 2007/0107189 A1 | 5/2007 | Prichard et al. |
| 2007/0272582 A1 | 11/2007 | Lau |
| 2007/0289246 A1 | 12/2007 | Schmitz |
| 2008/0023015 A1 | 1/2008 | Arnold et al. |
| 2008/0111024 A1 | 5/2008 | Lee et al. |
| 2008/0148817 A1 | 6/2008 | Miller et al. |
| 2008/0308674 A1 | 12/2008 | Frantz et al. |
| 2009/0120562 A1 | 5/2009 | Tsotsis et al. |
| 2009/0145545 A1 | 6/2009 | Brennan et al. |
| 2009/0148647 A1 | 6/2009 | Jones et al. |
| 2009/0211698 A1 | 8/2009 | McCowin |
| 2009/0273107 A1 | 11/2009 | Advani et al. |
| 2009/0320292 A1 | 12/2009 | Brennan et al. |
| 2010/0011580 A1 | 1/2010 | Brennan et al. |
| 2010/0012260 A1 | 1/2010 | Brennan et al. |
| 2010/0078126 A1 | 4/2010 | Brennan et al. |
| 2010/0170326 A1 | 7/2010 | Miller et al. |
| 2011/0079174 A1 | 4/2011 | Miller et al. |
| 2011/0259086 A1 | 10/2011 | Harris et al. |

(56) References Cited

U.S. PATENT DOCUMENTS

| | | |
|---|---|---|
| 2011/0259515 A1 | 10/2011 | Rotter et al. |
| 2013/0011586 A1 | 1/2013 | Landry et al. |

FOREIGN PATENT DOCUMENTS

| | | |
|---|---|---|
| EP | 0271263 A2 | 6/1988 |
| EP | 0319449 A2 | 6/1989 |
| EP | 0348831 A2 | 1/1990 |
| EP | 0391641 A2 | 10/1990 |
| EP | 0391641 B1 | 8/1994 |
| EP | 0629497 A2 | 12/1994 |
| EP | 0816438 A2 | 1/1998 |
| EP | 1038656 A1 | 8/2000 |
| EP | 1780120 A2 | 5/2007 |
| EP | 1995044 A2 | 11/2008 |
| EP | 1995045 A2 | 11/2008 |
| EP | 2067611 A1 | 6/2009 |
| EP | 2383106 A1 | 2/2011 |
| EP | 2383559 A1 | 4/2011 |
| EP | 2444240 A1 | 4/2012 |
| GB | 2478848 A | 9/2011 |
| JP | 60252235 A | 12/1985 |
| JP | 62259059 A | 11/1987 |
| JP | H06242087 A | 9/1994 |
| JP | 2002254429 A | 9/2002 |
| JP | 2004309379 A | 11/2004 |
| KR | 19970058260 | 11/1997 |
| WO | 9322127 A1 | 11/1993 |
| WO | 0176892 A1 | 10/2001 |
| WO | 02099416 A1 | 12/2002 |
| WO | 03021252 A1 | 3/2003 |
| WO | 2004031321 A1 | 4/2004 |
| WO | WO2004057120 A2 | 7/2004 |
| WO | 2005056391 A2 | 6/2005 |
| WO | 2005059500 A1 | 6/2005 |
| WO | 2006110627 A1 | 10/2006 |
| WO | 2006118692 A1 | 11/2006 |
| WO | 2008054499 A2 | 5/2008 |
| WO | 2008088435 A1 | 7/2008 |
| WO | 2010025376 A1 | 3/2010 |

OTHER PUBLICATIONS

Final Office Action, dated Nov. 16, 2012, regarding USPTO U.S. Appl. No. 12/764,202, 31 pages.
Buckingham et al., "Automating the manufacture of composite broadgoods," Composites Part A, vol. 27A, No. 3, Mar. 1996, pp. 191-200.
Campbell (Ed), "Ply Collation: A Major Cost Driver," In: Manufacturing Processes for Advanced Composites, Elsevier Advanced Technology, Oxford, UK, pp. 131-173, 2004.
El Amin, "Nano ink indicates safety breach in food packaging," dated Nov. 14, 2006, 2 pages. Retrieved from http://www.foodproductiondaily.com/Quality-Safety/Nano-ink-indicates-safety-breach-in-food-packaging.
Jayaweera et al., "Adaptive robotic assembly of compliant aerostructure components," Robotics and Computer-Integrated Manufacturing, vol. 23, No. 2, Jan. 2007, pp. 180-194.
Lee et al., "Novel UV-Activated Colorimetric Oxygen Indicator," Chemistry of Materials, vol. 17, No. 10, May 2005, pp. 2744-2751.
Mills et al., "UV-Activated Luminescence/Colourimetric O2 Indicator," International Journal of Photoenergy, vol. 2008, 2008, 6 pages.
Setnescu et al., "Polymer Films Doped with Colorants as Oxygen Sensitive Materials," Journal of Optoelectrics and Advanced Materials, vol. 8, No. 2, Apr. 2006, pp. 682-686.
Sieberg et al., "Eine fortschrittliche GFK—Fertigungstechnik setze sich durch: Praxiserfahrungen mit dem Vakuum-Injektions-Verfahren," Studiedag Vakuuminjecteren, XP002169062, Oct. 27, 1998, pp. 13-19. (German-language article not available in English).
European Search Report dated Mar. 2, 2009 regarding Application No. EP08171011 (EP2067611), 2 pages.
European Search Report, dated Sep. 30, 2011, regarding Application No. EP11160843 (EP2383559), 7 pages.
European Search Report dated Sep. 15, 2011 regarding Application No. EP11160866 (EP2383106), 4 pages.
European Search Report dated Mar. 2, 2012 regarding Application No. EP12151305 (EP2444240), 2 pages.
UK Intellectual Property Office Search Report dated Jul. 15, 2011 regarding Application No. GB1104472.4 (GB2478848), 5 pages.
Nternational Search Report dated May 29, 2008 regarding Application No. PCT/US2007/023455 (WO2008088435), 3 pages.
International Search Report dated Feb. 1, 2010 regarding Application No. PCT/US2009/055378 (WO2010025376), 3 pages.
Korean Intellectual Property Office Notice of Office Action dated Jun. 11, 2010, regarding Application No. 200847564, 9 pages.
Korean Intellectual Property Office Notice of Office Action dated Jun. 21, 2010, regarding Application No. 200847566, 14 pages.
USPTO Office Action dated Apr. 13, 2011 regarding U.S. Appl. No. 11/751,928, 19 pages.
USPTO Final Office Action dated Jun. 23, 2011 regarding U.S. Appl. No. 11/751,928, 11 pages.
USPTO Office Action dated Jan. 19, 2012 regarding U.S. Appl. No. 11/751,928, 13 pages.
USPTO Final Office Action, dated Jun. 20, 2012, regarding U.S. Appl. No. 11/751,928, 20 pages.
USPTO Office Action dated Mar. 10, 2010 regarding U.S. Appl. No. 11/829,900, 10 pages.
USPTO Notice of Allowance dated Jul. 30, 2010 regarding U.S. Appl. No. 11/829,900, 8 pages.
USPTO Notice of Allowance dated Sep. 21, 2012 regarding U.S. Appl. No. 12/725,380, 17 pages.
USPTO Office Action dated Feb. 21, 2012 regarding U.S. Appl. No. 12/906,489, 15 pages.
USPTO Notice of Allowance, dated Jun. 13, 2012, regarding U.S. Appl. No. 12/906,489, 9 pages.
USPTO Notice of Allowance, dated Sep. 14, 2012, regarding U.S. Appl. No. 12/906,489, 34 pages.
USPTO Office Action dated Jun. 2, 2010 regarding U.S. Appl. No. 11/751,931, 15 pages.
USPTO Final Office Action dated Aug. 11, 2010 regarding U.S. Appl. No. 11/751,931, 29 pages.
USPTO Office Action dated May 20, 2011 regarding U.S. Appl. No. 11/751,931, 31 pages.
USPTO Final Office Action dated Sep. 28, 2011 regarding U.S. Appl. No. 11/751,931, 24 pages.
USPTO Office Action dated Oct. 26, 2010 regarding U.S. Appl. No. 11/952,222, 20 pages.
USPTO Final Office Action dated Apr. 15, 2011 regarding U.S. Appl. No. 11/952,222, 20 pages.
USPTO Office Action dated Oct. 3, 2011 regarding U.S. Appl. No. 11/952,222, 21 pages.
USPTO Final Office Action dated Apr. 30, 2012 regarding U.S. Appl. No. 11/952,222, 25 pages.
USPTO Office Action dated May 17, 2010 regarding U.S. Appl. No. 12/200,882, 9 pages.
USPTO Final Office Action dated Oct. 26, 2010 regarding U.S. Appl. No. 12/200,882, 8 pages.
USPTO Office Action dated Jul. 27, 2010 regarding U.S. Appl. No. 12/242,477, 13 pages.
USPTO Final Office Action dated Dec. 2, 2010 regarding U.S. Appl. No. 12/242,477, 15 pages.
USPTO Notice of Allowance, dated Jul. 5, 2012, regarding U.S. Appl. No. 12/242,477, 9 pages.
USPTO Office Action, dated Apr. 26, 2012, regarding U.S. Appl. No. 12/764,202, 13 pages.
USPTO Office Action dated Nov. 14, 2011 regarding U.S. Appl. No. 12/768,007, 20 pages.
USPTO Final Office Action, dated May 3, 2012, regarding U.S. Appl. No. 12/768,007, 29 pages.
Miller et al., "Leak Detection in Vacuum Bags," USPTO U.S. Appl. No. 13/892,916, filed May 13, 2013, 48 pages.
Notice of Allowance, dated May 10, 2013, regarding USPTO U.S. Appl. No. 11/751,931, 49 pages.

(56) References Cited

OTHER PUBLICATIONS

Office Action, dated May 9, 2013, regarding USPTO U.S. Appl. No. 11/952,222, 27 pages.
Office Action dated Mar. 21, 2013, regarding USPTO U.S. Appl. No. 12/200,882, 47 pages.
Office Action, dated Apr. 1, 2013, regarding USPTO U.S. Appl. No. 12/764,202, 38 pages.
Final Office Action, dated Jul. 29, 2013, regarding USPTO U.S Appl. No. 12/200,882, 10 pages.
Final Office Action, dated Aug. 15, 2013, regarding USPTO U.S. Appl. No. 12/764,202, 16 pages.
Material Safety Data Sheet for Potassium indigotetrasulfonate, Sigma-Aldric Corporation, Dec. 13, 2012, 6 pages.

\* cited by examiner

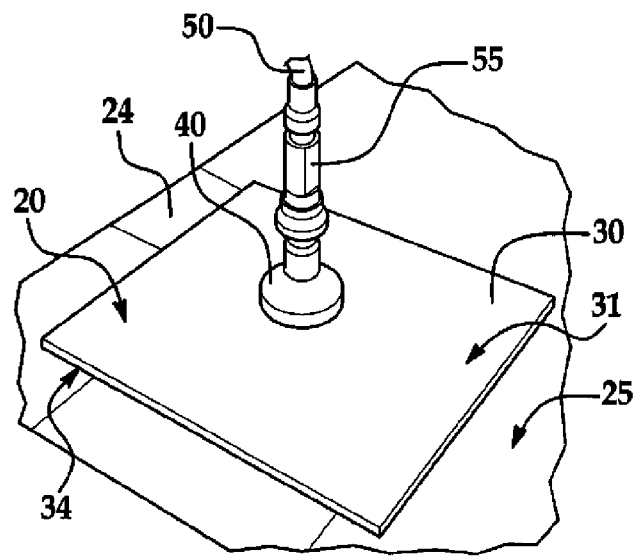
FIG. 6
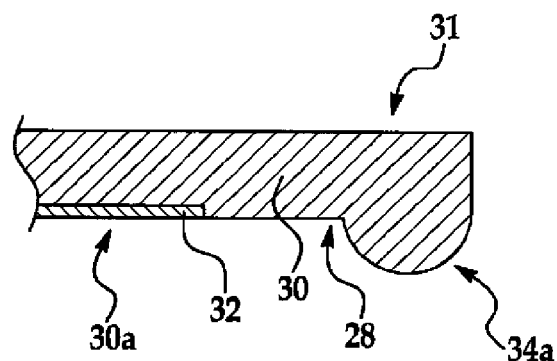
FIG. 7
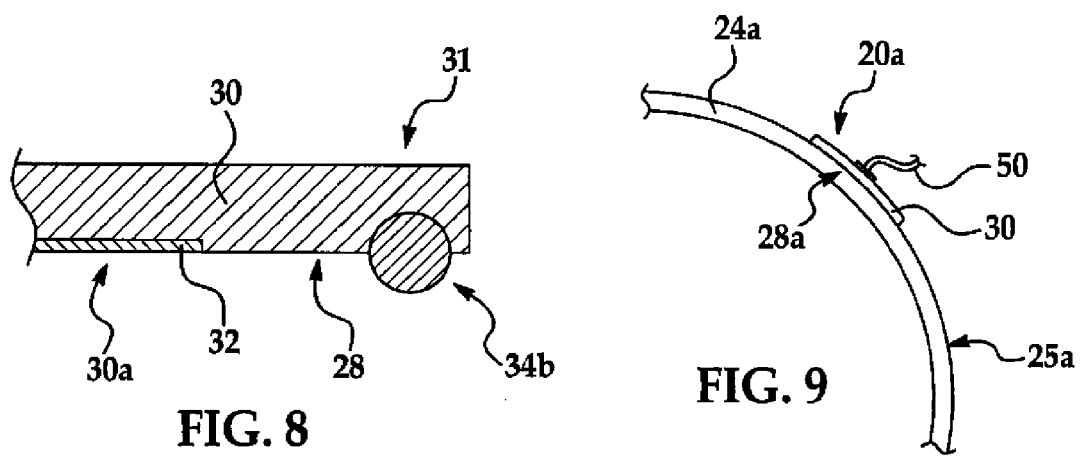
FIG. 8
FIG. 9

COMPACTION OF PREPREG PLIES ON COMPOSITE LAMINATE STRUCTURES

This application is a divisional application of U.S. patent application Ser. No. 12/242,477, filed Sep. 30, 2008, now U.S. Pat. No. 8,333,864, issued on Dec. 18, 2012.

TECHNICAL FIELD

This disclosure generally relates to fabrication of composite structures, especially large scale structures such as aircraft subassemblies, and deals more particularly with a method and apparatus for compacting uncured composite plies on the surface of a composite structure.

BACKGROUND

There is sometimes a need to compact one or more localized plies of composite prepreg on a surface of a composite laminate or ply layup that is considerably larger than the localized plies. For example, in the aircraft industry, local patches of composite plies, sometimes referred to as "doublers", may be applied to certain areas of large scale subassemblies such as fuselage sections in order to add stiffness, strength or reinforcements for fasteners.

In some cases, it may be most efficient to fabricate the doublers offline and then apply them to the fuselage sections as a kit. However, compacting these doublers to a fuselage section may be difficult because of the substantial force required to achieve the necessary compaction pressures, especially where the doublers are relatively large. For example, a door surround or window belt may require several tons of force that must be reacted against the surface of the structure to achieve proper compaction. A similar problem may exist where it is necessary to compact co-cured stringers on tooling or on surfaces of the structure.

Current solutions for reacting compaction forces are largely mechanical, and may require substantial tooling and equipment to handle the necessary reaction loads. The tooling and related equipment may be relatively heavy and expensive, especially where large scale structures such as wings or fuselage sections are involved.

An alternate method for reacting compaction forces involves sealing a vacuum bag over the entire surface of the structure, however this approach may be time consuming and may not allow other work to be performed in parallel with the vacuum bag compaction process. Moreover, problems may be encountered in holding the doubler or stringer in place during the process of applying the vacuum bag to the structure and drawing a vacuum.

Accordingly, there is a need for a method and related apparatus compacting doublers and other uncured part layups on large scale structures that reduce or eliminate the problems discussed above.

SUMMARY

In accordance with the disclosed embodiments compaction of uncured plies on cured or uncured large scale ply layups is achieved using a portable, reusable compaction sheet that is placed locally over the uncured plies. The compaction sheet has an included seal that seals the sheet directly to the ply layup to form a vacuum chamber around the uncured plies. The compaction sheet is flexible, allowing it to conform to and be sealed against a variety of part structural surfaces, including curved or contoured surfaces and surfaces having irregularities. The compaction sheet may be coupled with a vacuum source which evacuates the vacuum chamber to draw the compaction sheet against the ply layup, thereby compacting the uncured plies. The use of a portable compaction sheet temporarily applied to the ply layup allows pressure to be applied locally to the uncured plies, instead of reacting the compaction load externally or applying a vacuum bag to the entire ply layup.

The disclosed embodiments allow pre-kitted doublers and stringers to be installed and compacted on a ply layup in a single step, while assuring that they do not shift or fall away before they are compacted to the surface of the ply layup.

According to one disclosed embodiment, apparatus is provided for compacting at least one uncured ply against the surface of a ply layup, comprising: a flexible sheet adapted to be disposed over the uncured ply; a seal for sealing the perimeter of the sheet to the surface of the ply layup; and, means for applying a vacuum to the ply and the surface of the ply layup through the sheet. The flexible sheet is substantially gas impermeable and has a face adapted to engage and apply compaction pressure to the ply. Means for applying the vacuum includes a vacuum port on the sheet adapted to be coupled with a vacuum source, and a vacuum plate having a plurality of spatially distributed passageways through which a vacuum may be drawn.

According to another disclosed embodiment, apparatus is provided for compacting an uncured composite layup onto the surface of a ply layup, comprising: a sheet having a face adapted to be placed onto the surface of the ply layup and overlying the uncured layup; means on the sheet for forming a vacuum chamber over the surface of the ply layup and surrounding the uncured layup; and, a vacuum plate connected to the sheet for drawing a vacuum within the vacuum chamber. At least the perimeter of the sheet is sufficiently flexible to allow the sheet to conform to the surface of the ply layup. The sheet may include a breather for allowing vacuum pressure to be applied substantially uniformly over the uncured layup. The sheet may be contoured to generally match curvatures of the ply layup surface.

According to a disclosed method embodiment, compacting an uncured composite layup against the surface of a ply layup, comprises: positioning the uncured layup between a surface of the ply layup and a gas impermeable sheet; forming a gas impermeable seal between the sheet and the surface of the ply layup; and, using the sheet to compact the uncured layup by generating vacuum pressure between the sheet and the surface of the ply layup. The method may further include allowing the sheet to flex as the sheet compacts the uncured layup.

The disclosed apparatus and method satisfy the need for a simple and effective method of compacting local ply patches on a cured or uncured ply layup that uses a minimum amount of equipment and eliminates the need for large scale vacuum bags.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIG. 6 is a perspective view showing the compaction sheet positioned on the surface of a ply layup and illustrating a vacuum coupling.

FIG. 7 is a cross sectional view illustrating a compaction sheet having an integrally formed edge seal.

FIG. 8 is a cross sectional view illustrating a compaction sheet having an edge seal insert.

FIG. 9 is a cross sectional illustration of a portion of a curved ply layup and illustrating a compaction sheet contoured to match the curvature of the ply layup.

DETAILED DESCRIPTION

Figure 1:
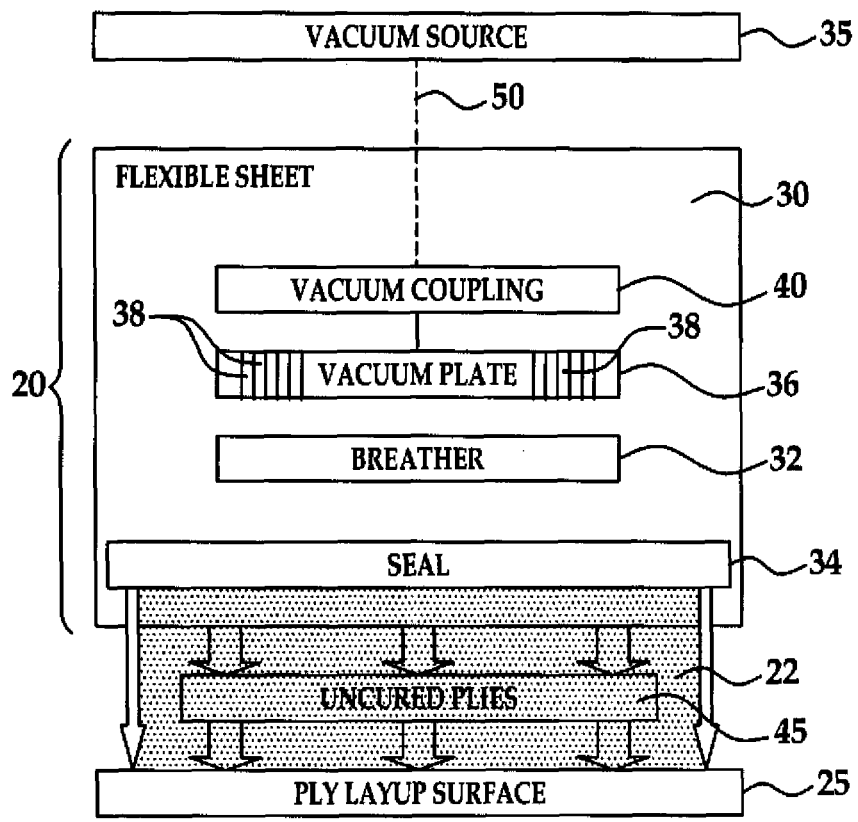
FIG. 1 is a functional block diagram of apparatus for compacting plies on a ply layup.
Figure 2:
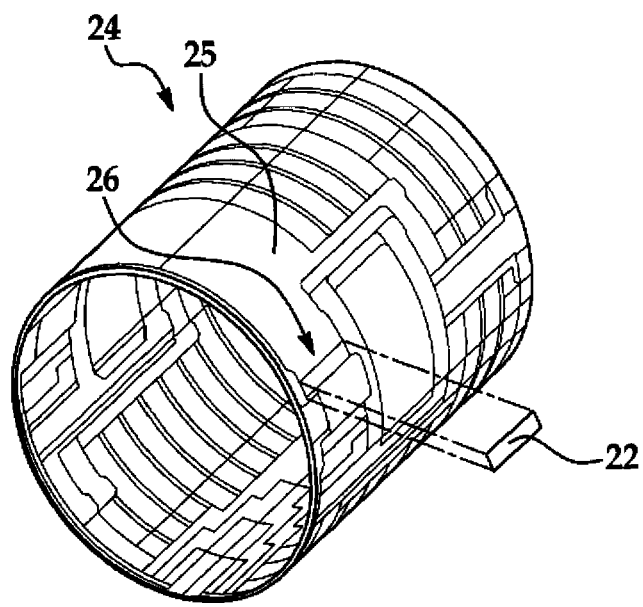
FIG. 2 is a perspective illustration of a typical aircraft fuselage section ply layup, and depicting a typical uncured doubler.

Referring first to FIGS. 1 and 2, the disclosed embodiments broadly relate to apparatus 20 and a related method for compacting one or more uncured plies 22 on the surface 25 of a ply layup 24, which may be uncured or uncured. The uncured composite plies 22, which may be prepreg for example, may form a doubler for stiffening or strengthening an area or feature 26 on the ply layup 24, or may comprise a preformed layup such as a stringer (not shown) that is to be applied to and co-cured with the ply layup 24. The size of the ply layup 24 is typically much greater than that of the plies 22 and thus the plies 22 may be considered as a local "patch" on the ply layup 24. However, while the apparatus 20 will be described in connection with its use for compacting local plies 22 on the surface 25 of a large scale ply layup 24, it is to be understood that the disclosed embodiments may also be used as a portable, drop-in-place compaction bag type device on a standard layup table, which may not require bag sealant, breather, parting film, bag film or the setup time required for these components.

The apparatus 20 broadly comprises a portable and flexible compaction sheet 30 which includes a vacuum coupling 40, a vacuum plate 30, a breather 32 and a seal 34. The vacuum coupling 40 couples the vacuum plate 36 with a vacuum source 35 via a vacuum line 50. The vacuum plate 36 includes passageways 38 therein that allow gas to pass therethrough. The seal 34 engages the ply layup surface 25 and forms a vacuum chamber 45 over the uncured plies 22. The portability of the compaction sheet 30 allows it to be readily moved to a location on the ply layup surface 25 where the uncured plies 22 are to be placed and compacted. Moreover, because the compaction sheet 30 includes a preassembly of the vacuum plate 36, breather 32 and seal 34, the need to assemble these individual components on the ply layup surface 25 for each ply compaction procedure may be eliminated.

Figure 3:
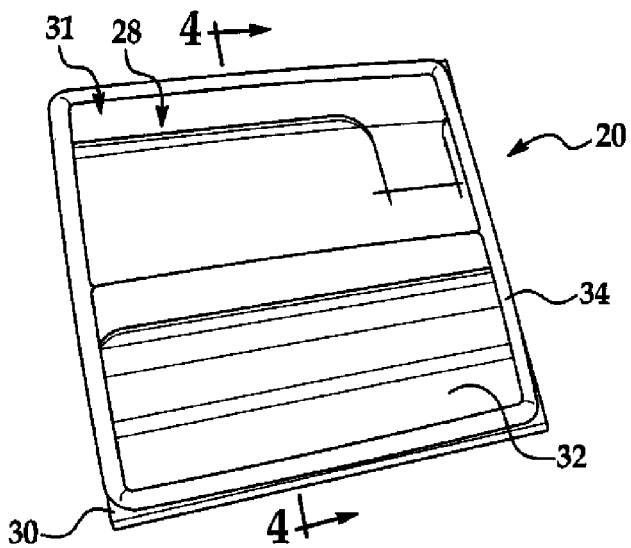
FIG. 3 is a perspective illustration of the face of a compaction sheet, showing the breather network and a vacuum seal.
Figure 4:
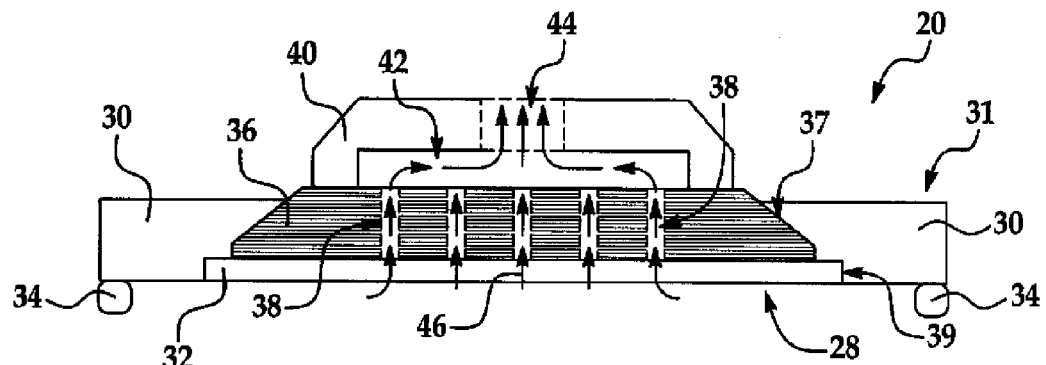
FIG. 4 is a sectional illustration taken along the line 4-4 in FIG. 3.

Referring now also to FIGS. 3 and 4, the compaction sheet 30 may be formed from a flexible and durable elastomeric-like material such as, without limitation, rubber, urethane, or a fluoroelastomer such as Viton®, such that at least the outer perimeter 31 of the sheet 30 may flex, thereby allowing the seal 34 to better conform to the contour of the surface 25 of the ply layup 24. The seal 34 may also be formed from a flexible, deformable material such as, without limitation, rubber without limitation, rubber, urethane, or a fluoroelastomer such as Viton®. The seal 34 may be attached to the bottom face 28 of the compaction sheet 30 by any suitable means, and extends around the entire periphery 31 of the compaction sheet 30. Alternatively, as will be later discussed, the seal 34 may be formed integral with the compaction sheet 30.

The vacuum plate 36 may be formed of a rigid, flexible or semi-flexible material and is disposed within a central recess 37 in the compaction sheet 30. The vacuum plate 36 includes a plurality of spatially distributed passageways 38 therein through which gas may escape from beneath the compaction sheet 30, as indicated by the arrows 46. The spatial distribution of the passageways 38 assists in assuring that a substantially uniform vacuum will be drawn over the area of the plies 22.

A breather network 32 is connected to the bottom face 28 of the compaction sheet 30, and beneath the vacuum plate 36. The breather network 32 may be positioned flush with the bottom face 28 of the compaction sheet 30 and functions to allow a more uniform application of vacuum pressure to the uncured plies 22 during the compaction process. A base 40 formed of metal or other rigid material is secured to the top of the vacuum plate 36 and includes a vacuum port 44 adapted to be coupled to the vacuum source (FIG. 1) via the vacuum line 50 (FIG. 1). The base 40 includes a manifold 42 that places the vacuum port 44 in communication with the passageways 38 in the vacuum plate and thus forms a collection area for gases escaping through the vacuum plate 36 before they are drawn out through the vacuum port 44. The passageways 38 extend in a direction generally normal to the planes of the plies 22, ensuring that gas may pass substantially unrestricted from the vacuum chamber 45 into the manifold 42.

Although the material from which the compaction sheet 30 is formed may be flexible, the incorporation of the rigid or semi-rigid vacuum plate 36 into the body of compaction sheet 30 provides at least central areas of compaction sheet 30 with sufficient structural support and stiffness such that the shape of the compaction sheet 30 is substantially maintained as the compaction sheet 30 is being moved from location-to-location, and placed at particular locations on the ply layup surface 25.

Figure 5:
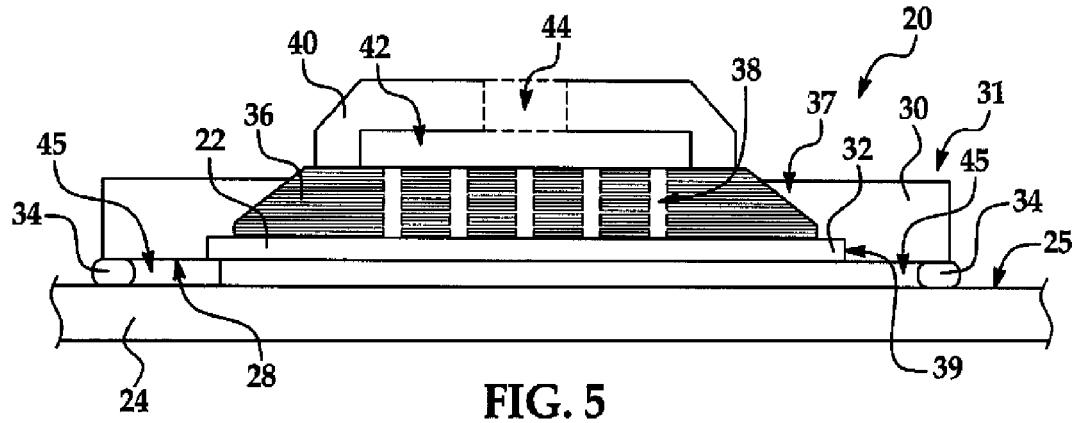
FIG. 5 is an illustration similar to FIG. 4 but showing an uncured layup being compacted against the surface of a ply layup.

FIG. 5 illustrates the apparatus 20 having been placed on the surface 25 of the ply layup 24 to compact plies 22 against surface 25. As gas is withdrawn from the vacuum chamber 45 through the vacuum plate 36, the compaction sheet 30 is drawn down by a vacuum pressure toward the surface 25, thereby compressing the seal 34 which seals the vacuum chamber 45. Compaction force is applied by ambient air pressure to the uncured plies 22 through the compaction sheet 30 and the breather network 32 as the gas continues to be evacuated from the vacuum chamber 45 through the vacuum plate 36.

FIG. 6 illustrates the use of a vacuum coupling 55 for coupling the base 40 to the vacuum line 50.

FIG. 7 illustrates an alternate embodiment in which the compaction sheet 30a and the seal 34a are of a one-piece, unitary construction. In this embodiment, the seal 34a may be formed from the same material as the compaction sheet 30a, as by molding the seal 34a and compaction sheet 30a as one piece at the same time.

FIG. 8 illustrates a further embodiment wherein the seal 34b may comprise a material that is the same as or different from that of the compaction sheet 34b, and forms an insert within the compaction sheet 34b, as may be accomplished using well known insert molding techniques.

Referring to FIG. 9, in some applications, a ply layup 24a may have curved or irregularly contoured surfaces 25a. In these applications, components of the apparatus 20a may be formed such that the bottom face 28a of the compaction sheet 30 is curved to match the contours or curvature of the surface 25a.

Figure 10:
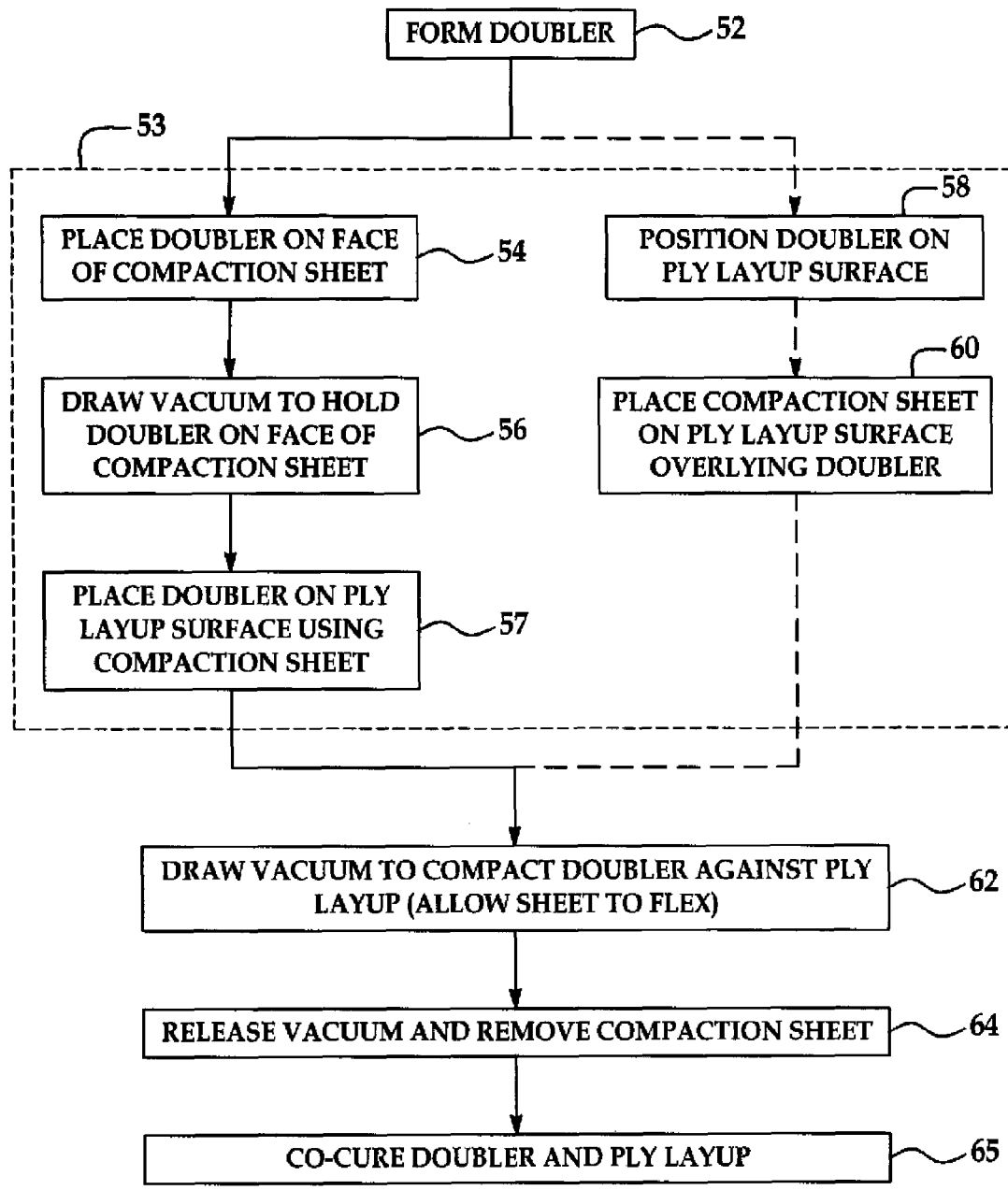
FIG. 10 is a simplified flow chart of a method for compacting uncured plies on a ply layup.

Attention is now directed to FIG. 10 which broadly illustrates the steps of a method for compacting the uncured plies 22 against the surface 25 of a ply layup 24. Beginning at step 52, the uncured doubler plies 22 or other single or multi-ply layup is formed, following which the uncured plies 22 are positioned between the face 28 of the compaction sheet 30 and the surface 25 of the ply layup 24, as generally indicated by the numeral 53. In one embodiment, the uncured plies 22 may be positioned between the apparatus 20 and the surface 25 by placing the uncured plies 22 on the face 28 of the compaction sheet 30, as shown at step 54. Then, at step 56, a vacuum may be drawn through the vacuum plate 36 which holds the plies 22 on the face 28 of the compaction sheet 30. With the uncured plies 22 held on the compaction sheet 30, the plies 22 may be placed on the ply layup surface 25 using the compaction sheet 30. Alternatively, as shown at steps 58 and 60, the uncured plies 22 may be manually placed on the ply layup surface 25, following which the compaction sheet 30 is placed on the ply layup surface 25, overlying the uncured plies 22.

After the uncured plies 22 have been positioned between the compaction sheet 30 and the ply layup surface 25, a vacuum is drawn in the vacuum chamber 45 which draws the compaction sheet 30 down against the uncured plies 22 thereby compacting the plies 22 against the ply layup surface 22. During this compaction process, the compaction sheet 30 is allowed to flex, thereby assuring that the seal 34 remains tightly compressed against the ply layup surface 25 to maintain the necessary vacuum pressure.

Finally, at step 64, the vacuum pressure may be released and the compaction sheet 30 may be removed, following which the uncured plies 22 and the ply layup 24 may be co-cured as shown at step 65.

Figure 11:
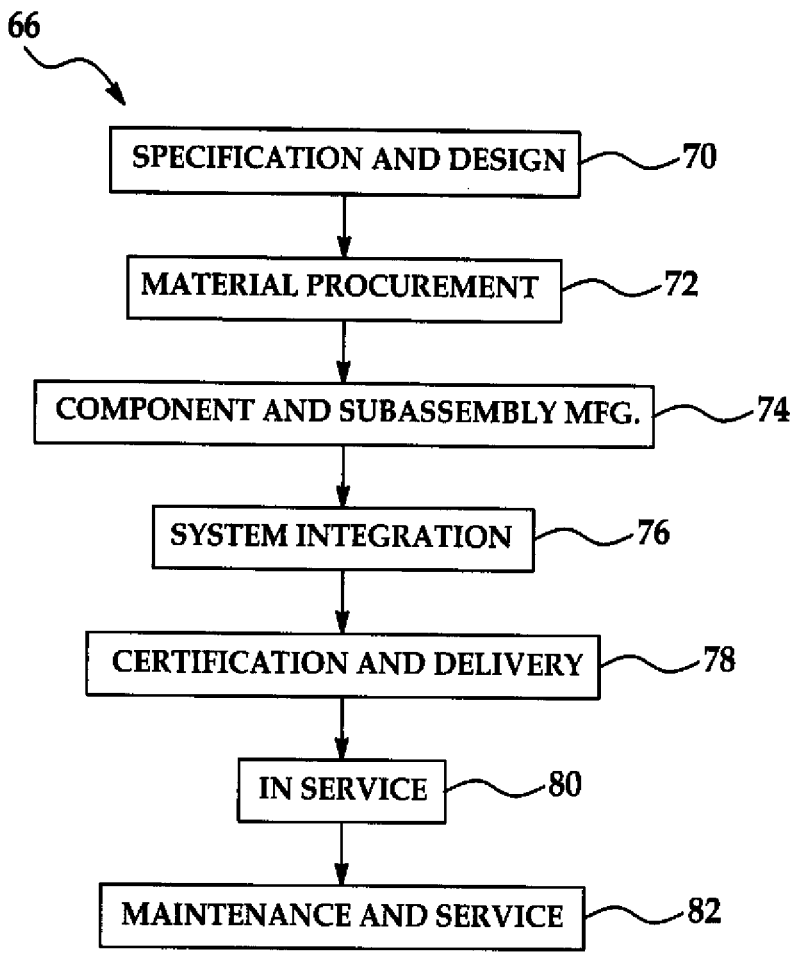
FIG. 11 is a flow diagram of aircraft production and service methodology.
Figure 12:
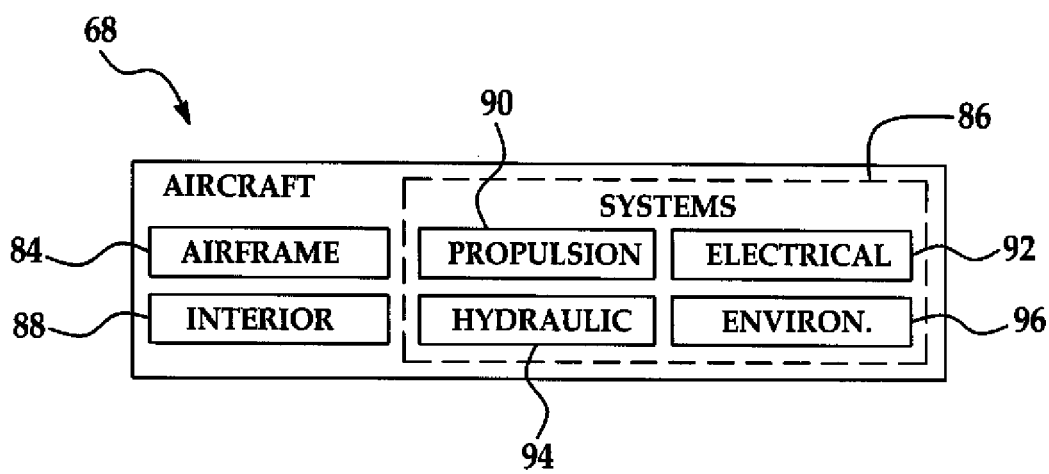
FIG. 12 is a block diagram of an aircraft.

Embodiments of the disclosure may find use in a variety of potential applications, particularly in the transportation industry, including for example, aerospace, marine and automotive applications. Thus, referring now to FIGS. 11 and 12, embodiments of the disclosure may be used in the context of an aircraft manufacturing and service method 66 as shown in FIG. 11 and an aircraft 68 as shown in FIG. 12. During pre-production, exemplary method 66 may include specification and design 70 of the aircraft 68 and material procurement 72. During production, component and subassembly manufacturing 74 and system integration 76 of the aircraft 68 takes place. Thereafter, the aircraft 68 may go through certification and delivery 78 in order to be placed in service 80. While in service by a customer, the aircraft 68 is scheduled for routine maintenance and service 82 (which may also include repair, modification, reconfiguration, refurbishment, and so on).

Each of the processes of method 66 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 68 produced by exemplary method 66 may include an airframe 84 with a plurality of systems 86 and an interior 88. Examples of high-level systems 86 include one or more of a propulsion system 90, an electrical system 92, a hydraulic system 94, and an environmental system 96. Any number of other systems may be included. Although an aerospace example is shown, the principles of the disclosure may be applied to other industries, such as the marine and automotive industries.

Systems and methods embodied herein may be employed during any one or more of the stages of the production and service method 66. For example, components or subassemblies corresponding to production process 74 may be fabricated or manufactured in a manner similar to components or subassemblies produced while the aircraft 68 is in service. Also, one or more apparatus embodiments, method embodiments, or a combination thereof may be utilized during the production stages 74 and 76, for example, by substantially expediting assembly of or reducing the cost of an aircraft 68. Similarly, one or more of apparatus embodiments, method embodiments, or a combination thereof may be utilized while the aircraft 68 is in service, for example and without limitation, to maintenance and service 82, including repairs.

Although the embodiments of this disclosure have been described with respect to certain exemplary embodiments, it is to be understood that the specific embodiments are for purposes of illustration and not limitation, as other variations will occur to those of skill in the art.

What is claimed is:

1. Apparatus for compacting at least one uncured ply against a ply layup comprising:
   a substantially gas impermeable flexible sheet adapted to be disposed over the ply wherein a bottom face of the sheet is adapted to engage and apply compaction pressure to the ply;
   a breather network positioned substantially flush with the bottom face of the sheet;
   a seal extending around the periphery of the sheet for sealing the perimeter of the sheet to a surface of the ply layup; and
   a vacuum plate held within the sheet and coupled with a vacuum port, the vacuum plate comprising a plurality of spatially distributed passageways extending through a bottom face of the vacuum plate through which a vacuum may be drawn, the bottom face of the sheet positioned beneath the vacuum plate.

2. The apparatus of claim 1, wherein:
   the seal is formed integral with the flexible sheet.

3. The apparatus of claim 1 further comprising:
   the vacuum port on the sheet adapted to be coupled with a vacuum source.

4. The apparatus of claim 3, further comprising:
   a base having the vacuum port therein, wherein the base is connected to the vacuum plate and includes a manifold communicating with each of the passageways in the vacuum plate.

5. The apparatus of claim 1, wherein the surface of the ply layup possesses a curvature and wherein:
   the bottom face of the flexible sheet includes a contour generally matching the curvature of the surface of the ply layup.

6. The apparatus of claim 1, wherein the flexible sheet is formed from one of: rubber, urethane, and a fluoroelastomer.

7. Apparatus for compacting an uncured composite layup onto a surface of a ply layup, comprising:
   a substantially gas impermeable flexible sheet having a face adapted to be placed onto the surface of the ply layup and overlying the uncured layup;
   a breather network positioned substantially flush with a bottom face of the sheet;

a seal around periphery of the sheet and engageable with the surface of the ply layup forming a vacuum chamber over the surface of the ply layup and surrounding the uncured layup; and, a vacuum plate mounted on the sheet for drawing a vacuum within the vacuum chamber, the vacuum plate comprising a plurality of spatially distributed passageways, the passageways extending in a direction generally normal to the planes of plies in the ply layup, the bottom of the sheet positioned beneath the vacuum plate.

8. The apparatus of claim 7, wherein: at least a perimeter of the sheet is sufficiently flexible to allow the sheet to conform to the surface of the ply layup.

9. The apparatus of claim 7, further comprising:
a vacuum port on the sheet adapted to be coupled with a vacuum source, and wherein the plurality of spatially distributed passageways communicating with the vacuum port for drawing gas from the vacuum chamber.

10. The apparatus of claim 7, wherein the breather network is on the face of the sheet for allowing vacuum pressure to be applied substantially uniformly over the uncured layup.

11. The apparatus of claim 7, wherein the surface of the ply layup possesses a curvature and wherein:
the sheet is contoured to generally match the curvature of the surface of the ply layup.

12. The apparatus of claim 7 wherein the vacuum plate is disposed within and is surrounded by the sheet.

13. Apparatus for compacting an uncured composite layup onto a surface of a composite aircraft part layup, comprising:
a flexible, gas impermeable compaction sheet having a bottom face adapted to be placed onto the surface of the part layup and conform to the surface of the part layup;
a seal on the compaction sheet surrounding a periphery of the bottom face and forming a vacuum chamber around the uncured layup;
a breather network positioned substantially flush with a bottom face of the sheet for allowing the application of substantially uniform vacuum pressure to the uncured layup;
a vacuum plate within the compaction sheet having a plurality of spatially distributed chamber passageways extending through a bottom face of the vacuum plate through which a vacuum may be drawn, the bottom face of the sheet positioned beneath the vacuum plate; and,
a base connected to the vacuum plate and having a vacuum port therein, the vacuum port on the compaction sheet for coupling the vacuum plate with a vacuum source.

* * * * *